US009061275B2

(12) United States Patent
Barnard, V et al.

(10) Patent No.: US 9,061,275 B2
(45) Date of Patent: Jun. 23, 2015

(54) METHODS OF REMOVING CALCIUM MATERIAL FROM A SUBSTRATE OR CATALYTIC CONVERTER

(71) Applicant: Steag Energy Services GmbH, Essen (DE)

(72) Inventors: Thomas Michael Barnard, V, Huntersville, NC (US); Albert Joseph Stier, Charlotte, NC (US); Thies Hoffmann, Lake Wylie, SC (US)

(73) Assignee: STEAG Energy Services GmbH, Essen (DE)

( * ) Notice: Subject to any disclaimer, the term of this patent is extended or adjusted under 35 U.S.C. 154(b) by 20 days.

(21) Appl. No.: 13/828,945

(22) Filed: Mar. 14, 2013

(65) Prior Publication Data

US 2014/0274661 A1 Sep. 18, 2014

(51) Int. Cl.
| | |
|---|---|
| *B01J 35/00* | (2006.01) |
| *B01J 23/22* | (2006.01) |
| *B01J 23/30* | (2006.01) |
| *B01J 23/92* | (2006.01) |
| *B01J 25/02* | (2006.01) |
| *B01D 53/86* | (2006.01) |
| *B01D 53/96* | (2006.01) |
| *B01J 38/62* | (2006.01) |
| *B01J 38/48* | (2006.01) |
| *B01J 38/70* | (2006.01) |

(Continued)

(52) U.S. Cl.
CPC .............. *B01J 38/62* (2013.01); *B01J 38/485* (2013.01); *B01J 38/70* (2013.01); *B01J 23/22* (2013.01); *B01J 23/30* (2013.01); *B01D 53/8625* (2013.01); *B01D 53/96* (2013.01); *B01D 2258/0283* (2013.01); *B01J 23/92* (2013.01); *B01J 27/02* (2013.01); *B01J 35/04* (2013.01)

(58) Field of Classification Search
CPC .......... B01J 38/62; B01J 38/485; B01J 38/70; B01J 27/02; B01J 35/04; B01J 23/22; B01J 23/30; B01J 23/92; B01D 53/96; B01D 53/8625; B01D 2258/0283
USPC ...................................................... 502/20–56
See application file for complete search history.

(56) References Cited

U.S. PATENT DOCUMENTS

| 2,150,961 A | 3/1939 | Cupery et al. |
| 2,225,294 A | 12/1940 | Bolton et al. |

(Continued)

FOREIGN PATENT DOCUMENTS

| EP | 0 159 959 A2 | 10/1985 |
| KR | 2011 0128665 A | 11/2011 |

OTHER PUBLICATIONS

King, G. et al., *The Solubility in Water of the Barium, Calcium, and Magnesium Salts of Sulfamic Acid*, J. Phys. Chem., 45(6) (1941) pp. 938-942.

(Continued)

Primary Examiner — Jennifer A Smith
(74) Attorney, Agent, or Firm — Alston & Bird LLP

(57) ABSTRACT

Methods of removing or softening calcium material from a substrate (e.g., a catalytic converter) and regenerating a catalytic converter are provided. A substrate (e.g., a catalyst support material) having a calcium containing material (e.g., calcium-containing fly ash) embedded or deposited thereon can be treated with a composition including one or more organosulfur oxoacids or salts thereof.

38 Claims, 9 Drawing Sheets
(9 of 9 Drawing Sheet(s) Filed in Color)

(51) Int. Cl.
  *B01J 27/02* (2006.01)
  *B01J 35/04* (2006.01)

(56) References Cited

U.S. PATENT DOCUMENTS

| | | |
|---|---|---|
| 4,039,471 A | 8/1977 | McArthur et al. |
| 4,454,240 A | 6/1984 | Ganguli |
| 5,013,698 A | 5/1991 | Lonsinger et al. |
| 7,569,506 B2 | 8/2009 | Foerster |
| 7,723,251 B2 | 5/2010 | Hartenstein et al. |
| 8,268,743 B2 | 9/2012 | Tembaak et al. |
| 2006/0135347 A1 | 6/2006 | Schluttig et al. |
| 2011/0160040 A1 | 6/2011 | Cooper et al. |
| 2011/0207597 A1 | 8/2011 | Tembaak et al. |

OTHER PUBLICATIONS

*Guideline for the Testing of DENOX Catalysts; VGB-R 302 He*; VGB Guideline; $2^{nd}$ Revised Edition 1998.
International Search Report and Written Opinion for Application No. PCT/US2014/015515 dated May 16, 2014.

US 9,061,275 B2

METHODS OF REMOVING CALCIUM MATERIAL FROM A SUBSTRATE OR CATALYTIC CONVERTER

TECHNICAL FIELD

The presently disclosed invention relates generally to methods of removing or softening a calcium material from a catalytic converter, including DeNOx or SCR catalysts, and methods of regenerating a catalytic converter having a calcium-containing fly ash directly or indirectly deposited thereon.

BACKGROUND

High temperature thermal processes, for example, the generation of steam for the production of electricity in power plants utilizing fossil fuels and biomass or the incineration of domestic waste, often create environmentally harmful by-products. These, among others, include nitrogen oxides ($NO_x$—refers to NO and $NO_2$) and sulfur oxides ($SO_2$ and $SO_3$). These compounds have to be removed from the flue gases of the high temperature thermal process before being discharged to the environment.

The standard for removing $NO_x$ from flue gases is the Selective Catalytic Reduction (SCR) process, where a reducing reagent, typically ammonia, is injected, mixed into the flue gas, and sent through a catalytic reaction chamber where a catalyst facilitates the reduction of $NO_x$ with the reducing agent to form nitrogen gas and water.

Throughout the operation of the catalyst, it becomes contaminated due to the accumulation of various substances from the flue gas on the catalyst. Most of them are responsible for the catalyst's decrease in activity, such as sodium, potassium, phosphorus and arsenic. Others, like iron, however, are known to be the main contributor for the increase of the SO2/SO3 conversion rate during the catalysts usage cycle. This type of contamination is due to chemical bonding of the compounds onto the catalyst.

In addition, the catalyst can become physically plugged with fly ash—the combustion residue from the fuel incinerated in the thermal process. During the operation of the SCR reactor the fly ash accumulates within and on top of the catalyst. The gradient of contamination is typically the highest on the flue gas inlet side and decreases towards the flue gas outlet side.

The fly ash removal technology is geared towards the physical properties of the fly ash which varies depending on the fuel type and operating conditions in the thermal process. It can be a fine powder or Large Particle Ash (LPA) (approximately 0.2 to 1 inch) and can develop into big chunky pieces (approximately 1 to 5 inches) when accumulating on the catalyst. Both types of fly ash form in the boiler and easily carry over into the SCR reactor causing catalyst pluggage which leads to flue gas maldistribution, loss of SCR performance through loss of available DeNOx potential, unacceptable $NH_3$ slip, excessive pressure drop and catalyst erosion damage.

Fine powder fly ash can be removed using Electro Static Precipitators (ESP) which are installed upstream or downstream of the SCR reactor depending on the SCR arrangement (High Dust, Low Dust, or Tail End). The LPA, also known as popcorn ash, can be collected prior to the SCR reactor by means of LPA screens, which are typically located between the economizer outlet and SCR inlet.

Depending on the source and makeup of the fuel incinerated, the components of the fly ash produced vary considerably. Fly ash typically includes varying amounts of silica (silicon dioxide, $SiO_2$) (both amorphous and crystalline), aluminum oxide ($Al_2O_3$), iron oxide ($Fe_2O_3$), lime (calcium oxide, CaO), and other types of calcium material (various calcium salts such as calcium carbonate and calcium sulfate).

Despite the above mentioned technologies, the fly ash removal may not be sufficient to protect the catalyst from pluggage which leads to premature loss of SCR performance. Loose powder can plug the channels of honeycomb-type catalyst with individual channels being partially or fully inaccessible for the flue gas. Chunky pieces can deposit on top of catalyst modules and block the flue gas passage through honeycomb, plate or corrugated catalyst. Popcorn ash travels through the channels of honeycomb style catalysts and deposits at a location where it can get "wedged" between the channel walls providing an environment for loose powder ash to accumulate and plug the channel. The result can be a catalyst with a pluggage rate ranging from approximately 10% to 100% rendering the catalyst with a decreased $NO_x$ removal efficiency.

In some applications the physical contamination outweighs the chemical contamination. The result is a decrease of the operation time and a pre-mature exchange of the catalyst. Pluggage removal in-situ (installed in the SCR reactor), ex-situ and on site (removed from the SCR reactor and treated on premise), or ex-situ and off site (removed from the SCR reactor and treated at a regeneration facility) could extend the operation time of the catalyst.

Substrates (e.g., catalytic converters) that contain calcium material deposited thereon (e.g., particularly calcium-containing fly ash material) have been found particularly difficult to clean, and ultimately, rejuvenate. Additional methods of treating substrates and rejuvenating catalytic converters are highly desired.

Accordingly, there remains a need, at least, for a more efficient method to remove the calcium-containing fly ash, and to open and unplug catalyst channels to provide a fly ash-free (or nearly-fly ash-free) catalyst prior to a wet-chemical rejuvenation or regeneration process.

BRIEF SUMMARY

One or more embodiments of the present invention may address one or more of the aforementioned problems. Certain embodiments according to the present invention provide methods of softening or removing a calcium material from a substrate (e.g., a catalytic converter). According to certain embodiments of the present invention, the methods of removing or softening a calcium material from a substrate can comprise steps of providing a substrate (e.g., a catalytic converter) in which a calcium material is deposited directly or indirectly (e.g., layer of calcium material overlying a blinding layer of material directly deposited onto the substrate) on at least a portion of substrate (e.g., a catalytic converter) followed by treating the substrate (e.g., a catalytic converter) with a treatment composition to at least one of soften or remove at least a portion of the calcium material. In such embodiments, the treatment composition can comprise at least one organosulfur oxoacid or salt thereof. In certain preferred embodiment, the at least one organosulfur oxoacid or salt thereof can comprise a sulfonic acid or salt thereof.

In another aspect, the present invention provides methods of regenerating a catalytic converter. In accordance with certain embodiments of the present invention, a catalytic converter having a calcium-containing fly ash deposited directly or indirectly thereon can be treated with a treatment composition to at least one of soften or remove at least a portion of the calcium-containing fly ash. The treatment composition, according to certain embodiments of the present invention, can comprise at least one organosulfur oxoacid or salt thereof. After subjecting the catalytic converter to a treatment with an organosulfur oxoacid or salt thereof, a portion of any remaining calcium-containing fly ash remaining on the catalytic converter can be directly (e.g., spraying with fluid, scrapping, brushing, etc.) or indirectly (e.g., ultrasonic treatment, lifting in and out of solution) physically removed. The catalytic converter, preferably having a majority of the calcium-containing fly ash removed, can be impregnated with at least one NO removal catalytically-active metal to provide a regenerated catalytic converter. In certain preferred embodiments, the catalytic converter is subjected to a cleaning/detoxing process (e.g., a wet-chemical cleaning operation) to remove at least a portion of any accumulated catalytic poisons (e.g., sodium, potassium, arsenic, phosphorous, iron, or combinations thereof) from the catalytic converter prior to impregnation with at least one NO removal catalytically-active metal.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described embodiments of the invention in general terms, reference will now be made to the accompanying drawings, which are not necessarily to scale, and wherein:

DETAILED DESCRIPTION

Figure 1:
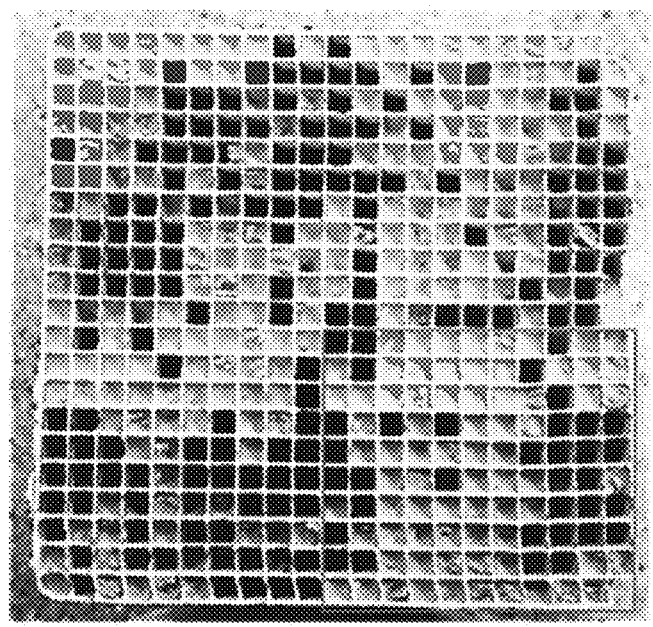
FIG. 1 shows a honeycomb substrate prior to being submerged in a 4% sulfamic acid solution including a box drawn around a portion of the log that was ultimately cut out and soaked in the sulfamic acid solution.

The present invention now will be described more fully hereinafter with reference to the accompanying drawings, in which some, but not all embodiments of the inventions are shown. Indeed, this invention can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one aspect, embodiments of the present invention are directed to methods of removing or softening a calcium material from a substrate comprising steps of providing a substrate (e.g., a catalytic converter) in which a calcium material is deposited directly or indirectly (e.g., layer of calcium material overlying a blinding layer of material directly deposited onto the substrate) on at least a portion of substrate (e.g., a catalytic converter) followed by treating the substrate (e.g., a catalytic converter) with a treatment composition to at least one of soften or remove at least a portion of the calcium material. In such embodiments, the treatment composition can comprise at least one organosulfur oxoacid or salt thereof. In certain preferred embodiment, the at least one organosulfur oxoacid or salt thereof can comprise a sulfonic acid or salt thereof.

According to certain embodiments of the present invention, a substantial amount of calcium material or calcium-containing fly ash material can be removed from a substrate or catalytic converter using a treatment composition that contains, or that has been prepared from, an organosulfur oxoacid or salt thereof (e.g., sulfonic acid or salt thereof). The treatment composition, in accordance with certain embodiments of the present invention, can be particularly effective in removing calcium material deposited or coated on substrate surfaces along with fly ash. Fly ash is considered a portion of the solid combustion product of coal, and the calcium material in the fly ash can be any form of calcium included in the fly ash. In general, the higher the calcium contents of coal, the higher the calcium content of the solid combustion product (i.e., the fly ash). Beneficially, certain embodiments of the present invention are particularly suited for removing high calcium content materials from a substrate (e.g., a catalytic converter).

Substrate

In accordance with certain embodiments of the present invention, the substrate that is treated for removing calcium material (e.g., calcium-containing fly ash) can comprise a substrate capable of supporting or having embedded therein one or more metals that act as a catalyst, particularly at least one nitrogen oxide reduction catalyst. In certain embodiments, a preferred substrate can comprise or be referred to as a catalyst support material or catalytic converter substrate material. The substrate, according to certain embodiments, can be of any appropriate material for supporting a catalyst. Preferred substrates include metal or ceramic substrates. Particularly preferred substrates include metal, ceramic, or metal oxide substrates having plate, honeycomb, corrugated or mesh-type configurations. In certain preferred embodiments, that is, the substrate can comprise a catalytic converter having a honeycomb structure.

Metallic substrates that can be used in accordance with certain embodiments of the present invention can be composed of one or more metals or metal alloys. In one embodiment, for instance, the metallic substrates can be employed as a mesh-type support substrate. Preferred metallic materials include heat resistant metals and metal alloys such as titanium and stainless steel as well as other alloys in which iron is a substantial or major component. Such alloys may contain, for example, one or more metals selected from the group consisting of nickel, chromium and aluminum.

In certain embodiments, the substrate can comprise a metallic substrate, particularly in the form of a mesh-type support, wherein the metallic substrate material is comprised of a metal alloy material. In certain preferred embodiments, the alloy material comprises from 3 wt % to 30 wt % chromium, from 1 wt % to 10 wt % aluminum, or from 5 wt % to 50 wt % nickel, based on total weight of the metal substrate (excluding catalyst).

The alloys may also contain small or trace amounts of one or more other metals such as manganese, copper, vanadium, titanium and the like. The surface of the metal carriers may be oxidized at high temperatures (e.g., 1000° C. and higher) to improve the corrosion resistance of the alloy, such as by forming an oxide layer on the surface of the carrier. Such high temperature-induced oxidation may enhance the adherence of a refractory metal oxide support and catalyst components to the carrier.

One particular metal substrate that can be used as a substrate in a catalytic converter is an iron-chromium alloy. In certain embodiments, the iron-chromium alloy can be provided in the form of a foil, and preferably can have a thickness of from about 0.02 mm to about 0.06 mm.

In addition to metallic substrates, ceramic substrates can be used in accordance with certain embodiments of the present invention and generally include any suitable metal oxide or refractory material. Examples of such materials include, but are not limited to, titania, alumina, silica, alumina-silica, zirconia, magnesium oxide, hafnium oxide, lanthanum oxide, cordierite, cordierite-alpha alumina, silicon nitride, zircon mullite, spodumene, alumina-silica magnesia, zircon silicate, sillimanite, magnesium silicates, zircon and petalite.

According to certain embodiments of the present invention, the substrate comprises a catalytic converter, such as having a honeycomb structure or configuration. Any suitable substrate material as described above can generally be employed depending on an intended end use (e.g., to be used in a particular power plant predominately burning a certain type of material). In certain embodiments, the substrate comprises a monolithic catalytic converter having a plurality of parallel gas flow passages/conduits. The passages can preferably comprise substantially straight paths that extend from their fluid inlet to their fluid outlet. The substrate material (e.g., catalytic converter) has embedded therein or deposited thereon the catalytic material (e.g., at least one $NO_x$ reduction catalyst). The flow passages are preferably thin-walled. Suitable cross-sectional shape and size of the flow passages include trapezoidal, rectangular, square, sinusoidal, hexagonal, oval, circular, etc., structures. Such structures preferably contain from about 5 to about 600 gas inlet openings (i.e., "cells") per square inch of cross section.

In certain preferred embodiments, the catalytic converter comprises a DeNOx catalyst. In more preferred embodiments, the catalytic converter comprises a SCR catalyst. Prior to treatment, according to certain embodiments of the present invention, the catalytic converter comprises a substantially deactivated catalytic converter with approximately 20% to 70% loss of DeNOx performance activity.

A deactivated catalyst can be defined as a catalyst that exhibits decreased performance due to plugging, catalyst masking, catalyst poisoning, or a combination of all three. Decreased performance due to plugging would include microscopic blockage of the catalyst pores and macroscopic pluggage of the catalyst channels. Microscopic pluggage leads to a decrease of the catalytically active surface, where macroscopic pluggage leads to flue gas maldistribution, unacceptable $NH_3$ slip, excessive pressure drop, and catalyst erosion damage. Catalyst masking deactivates a catalyst by macroscopic blockage of the catalytically active surface by a dense second-phase coating. Catalyst poisoning causes the deactivation of the active catalyst sites by chemical attack.

Calcium Material

As noted above, certain embodiments of the present invention are particularly effective in softening or removing calcium material (e.g., calcium-containing fly ash) from a substrate. In accordance with certain embodiments, the calcium material can be deposited on the substrate (e.g., a catalytic converter) as a result of at least a portion of the coal combustion product containing the calcium material coming into contact with the substrate. In general, the coal combustion product is a mix of a gas and solid, and the calcium material that is to be removed will be contained in at least a portion of the solid material (i.e., fly ash) that comes into contact with and is deposited on the substrate. In certain preferred embodiments, the substrate is a catalytic converter for converting nitrogen oxides in the combustion product to nitrogen and oxygen.

In certain embodiments of the present invention, the calcium material on the substrate being provided for treatment is in the form of calcium-containing fly ash that has been deposited on the substrate (e.g., catalytic converter). The substrate that is treated according to embodiments of the present invention, for instance, can have deposited thereon a calcium-containing fly ash material from the combustion of sub-bituminous or lignite coal, which is generally high in calcium oxide content.

Calcium-containing fly ash material deposited on the substrate (e.g., catalytic converter) can be the combustion product of coal in which the non-combusted coal has a calcium oxide content of at least 1.0 wt %, based on total weight of the non-combusted coal. In another embodiment, the calcium-containing fly ash material can be from the combustion product of coal in which the non-combusted coal has a calcium oxide content of at least 5 wt %, or at least 15 wt %, or up to 40 wt %, based on total weight of the non-combusted coal. The calcium content of the coal (given in terms of calcium oxide) is preferably determined according to VGB Guideline, Guideline for the Testing of DENOX Catalysts, VGB-R 302 He, 2nd revised edition.

Certain embodiments of the present invention are particularly effective in removing high calcium content material (e.g., calcium-containing fly ash) from a substrate (e.g., a catalytic converter). In accordance with certain embodiments, the calcium content of the calcium-containing fly ash removed from the substrate (e.g., a catalytic converter) contains at least 15 wt % calcium oxide (e.g., at least 18% or at least 20%), based on total weight of the fly ash. In certain embodiments, the calcium content in the calcium-containing fly ash can comprise from 0.2 to 30 wt % calcium oxide based on total weight of the fly ash (e.g., 14 to 25 wt % calcium oxide based on total weight of the fly ash) The calcium content of the fly ash is preferably determined according to VGB Guideline, Guideline for the Testing of DENOX Catalysts, VGB-R 302 He, 2nd revised edition.

TABLE 1

Selected Fly Ash Component Ranges based on Coal Type

| Component | Unit | Coal Type | | |
|---|---|---|---|---|
| | | Bituminous | Sub Bituminous | Lignite |
| $SiO_2$ | % wt. | 20-60 | 40-60 | 23-67 |
| $Al_2O_3$ | % wt. | 5-35 | 20-30 | 10-24 |
| $Fe_2O_3$ | % wt. | 10-40 | 4-10 | 1-22 |
| CaO | % wt. | 1-12 | 5-30 | 1.7-22 |
| Loss On Ignition | % | 0-3 | 0-5 | 0-5 |

Treatment Composition

The treatment composition according to certain embodiments of the present invention that can be used to treat, soften, or remove at least a portion of the calcium material can comprise an aqueous composition including at least one organosulfur oxoacid or salt thereof. The term "organosulfur oxoacid" as used herein generally includes acids that contain (1) a hydrogen atom bonded to an oxygen atom or the ionized form thereof (e.g., ion formed by the loss of one or more protons) and (2) a sulfur atom. In certain embodiments, the term "organosulfur oxoacid" can comprise a sulfonic acid that is prepared from at least one member of the class of organosulfur compounds having the general formula RS(=O)2OH, in which preferably the S(=O)2-OH is sulfonyl hydroxide and R is an alkyl, aryl, or amino group (more preferably R is an amino group).

In certain embodiments, the organosulfur oxoacid or salt thereof comprises at least one sulfonic acid or salt thereof, sulfonic acid or salt/esters thereof, sulfenic acid, or combinations thereof. In certain preferred embodiments, the organosulfur oxoacid or salt thereof comprises a sulfonic acid or salt thereof since sulfonic acids (e.g., an amine sulfonic acid) can be particularly effective at removing calcium oxide. In one preferred embodiment, the organosulfur oxoacid or salt thereof is sulfamic acid.

In certain embodiments of the present invention, the organosulfur oxoacid or salt thereof can be used in combination with one or more mineral acids. Mineral acids can include any acid derived from an inorganic compound and form hydrogen and the conjugate base ions when dissolved in water. Exemplary mineral acids include, but are not necessarily limited to, sulfuric acid, hydrochloric acid, nitric acid, boric acid, phosphoric acid, hydrofluoric acid, hydrobromic acid, and perchloric acid.

In accordance with certain embodiments of the present invention, the organosulfur oxoacid or salt thereof comprises at least one member according to the general formula:

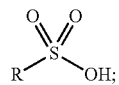

wherein,
R is an alkly, aryl, or amine moiety. Preferably, R is an amine moiety.
An organosulfur oxoacid or salt thereof according to certain embodiments can comprise at least one member according to the general formula:

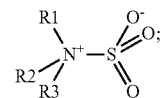

wherein,
R1, R2, and R3 are independently selected from an alkyl, aryl, or Hydrogen
In certain embodiments, the organosulfur oxoacid or salt thereof comprises a sulfonic acid which preferably comprises an akylsulfonic acid, an arylsulfonic acid, an aminosulfonic acid, or combinations thereof. Examples of akylsulfonic acids that can be used according to certain embodiments of the present invention include, but are not limited to, methanesulfonic acid, ethanesulfonic acid, and 3-aminopropane-1-sulfonic acid. Examples of arylsulfonic acids that can be used according to certain embodiments of the present invention include, but are not limited to, benzene sulfonic acid, toluene sulfonic acid, and aniline-2-sulfonic acid. Examples of aminosulfonic acids that can be used according to certain embodiments of the present invention include, but are not limited to, sulfamic acid, methylsulfamic acid, ammonium sulfamate, and isopropylsulfamic acid.

Various specific organosulfur oxoacid compounds that can be used in certain embodiments of the present invention include the following: sulfamic acid; sodium sulfamate; disodium sulfamate; trisodium sulfamate; calcium sulfamate; dicalcium sulfamate; methanesulfonic acid; sodium methanesulfonate; disodium methanesulfonate; trisodium methanesulfonate; calcium methanesulfonate; dicalcium methanesulfonate; toluene sulfonic acid; sodium toluenesulfonate; disodium toluenesulfonate; trisodium toluenesulfonate; calcium toluenesulfonate; dicalcium toluenesulfonate; and benzene sulfonic acid.

In certain embodiments of the present invention, the treatment composition (e.g., aqueous sulfonic acid treatment solution) can be prepared by mixing the organosulfur oxoacid with water to form an aqueous solution having a desired acid concentration. According to embodiments of the present invention, the concentration of any component is determined according to weight of the component added into a mixture to form the final material. For example, a concentration of 10 wt % of a component means that 10 parts by weight of the component is mixed with 90 parts by weight of all other components in the final composition to form a 10 wt % concentration of that component.

The treatment composition can contain an amount of organosulfur oxoacid (e.g., sulfonic acid) effective for removing at least a majority of calcium material present on the substrate (e.g., catalytic converter). For example, the treatment composition can be prepared at a total organosulfur oxoacid (e.g., sulfonic acid) concentration of from 0.3 wt % to 50 wt % (e.g., 0.3 to 25 wt. %, 0.3 to 10 wt. %, 0.3 to 8 wt. %, etc.), based on total weight of the acid composition used to treat the substrate. Preferably, the treatment material contains at least 0.3 wt %, more preferably at least 2 wt %, still more preferably at least 3 wt %, and most preferably at least 4 wt % organosulfur oxoacid (e.g., sulfonic acid).

In certain embodiments according to the present invention, treatment of the substrate or catalytic converter with the acid composition can be carried out at an average pH of from 0.5 to 5.0. Preferably, treatment of the substrate with the acid composition is carried out at an average pH of from 0.8 to 1.5, more preferably from 0.9 to 1.2

The substrate (e.g., catalytic converter) can be treated or contacted with the treatment composition for a time that removes a substantial amount (e.g., a majority) of the calcium material (e.g., calcium-containing fly ash) from the substrate being treated. Preferably, the substrate can be treated or contacted with the treatment composition from 2 minutes to 48 hours. More preferably, from 30 minutes to 4 hours, still more preferably from 1 hour to 2 hours. Preferably, the observed removal of the calcium material (e.g., calcium-containing fly ash) from the substrate (e.g., catalytic converter) being treated is from 50% to 100%, more preferably from 80% to 100%, and most preferably 100%.

In certain embodiments, the substrate (e.g., catalytic converter) can preferably be treated or contacted with the treatment composition in a vessel that is suitable for immersing or submerging the substrate or catalytic converter into the treatment composition. Catalytic converters to be treated according to embodiments of the present invention can be completely or partially submerged in the treatment composition as desired. Agitation during treatment can be preferably provided during treatment of the substrate. For instance, either the treatment composition can be agitated or the substrate or converter can be physically moved to cause agitation. The treatment composition can be agitated by any suitable means, including by mechanical means or by flowing a fluid such as air through the treatment composition.

In accordance with certain embodiments, the average temperature during treatment of the substrate or converter comprises at least 10° C. More preferably, the average temperature during treatment of the substrate or converter comprises from 10° C. to 90° C., more preferably from 20° C. to 80° C., and most preferably from 30° C. to 50° C. In accordance with alternative embodiments, the average temperature during treatment of the substrate or converter comprises from 50° C. to 80° C.

Following treatment of the substrate (e.g., catalytic converter) with the treatment composition, the substrate can be subjected to a further cleaning step comprising directly or indirectly physically removing at least a portion of any remaining or softened calcium material remaining on the substrate (e.g., catalytic converter). In certain embodiments of the present invention, the subsequent physical cleaning step can comprise spraying/rinsing the catalytic converter with a fluid (e.g., air, gas, water), scrapping the material off of the substrate (e.g., catalytic converter), subjecting the substrate (e.g., catalytic converter) to an ultrasonic treatment (as discussed in more detail below), or combinations thereof. In certain preferred embodiments, the substrate (e.g., catalytic converter) can be rinsed with an aqueous composition to further remove at least a portion of the calcium material. Rinsing can be accomplished by any practical means. Examples of rinsing include, but are not limited to, spraying, immersion, or a combination of methods. The aqueous composition used for rinsing can preferably comprise at least about 50 wt % water. More preferably, the aqueous rinsing composition comprises distilled water, de-ionized water, or tap water.

In certain embodiments, for instance, the step of treating the substrate (e.g., catalytic converter) with a treatment composition as discussed herein can be performed to an extent to merely soften the calcium material (e.g., calcium-containing fly ash) or allow surface penetration such that removal of the calcium material by other conventional means is commercially viable. For example, the calcium material can be softened during the treatment step and subsequently physically removed, for instance, by the "further cleaning step" comprising directly or indirectly physically removing the calcium material as discussed herein.

Removal of the calcium material can be enhanced by ultrasonic treatment in accordance with certain embodiments of the present invention. In certain embodiments, for instance, a step of subjecting the treatment composition to an ultrasonic treatment for at least a portion of the time in which the catalytic converter is at least partially submerged in the treatment composition can be carried-out to enhance removal of the calcium material. Ultrasonic treatment takes place by exposing the treatment composition used to treat the substrate (e.g., catalytic converter) to ultrasonic sound. The composition to which ultrasonic sound is applied can be any of the treatment compositions described herein. Preferably, ultrasonic treatment or exposure to ultrasonic sound is applied during treatment, during the post-treatment physical cleaning step (e.g., rinsing), or both.

In certain embodiments, the substrate (e.g., catalytic converter) can be exposed to a high-frequency ultrasonic vibration, with a simultaneous flow of treatment composition across the substrate (e.g., catalytic converter). The intensity of the ultrasound can be regulated and adapted to the degree of soiling. Preferably, ultrasonic sound is applied in the range of from 15 kHz to 150 kHz with the applied power ranging from 3 to 15 watts per liter of aqueous composition. For instance, the percentage of power applied from each transducer can be varied allowing for a variance in power. Additional transducers can be added, or removed, further varying the power output. According to certain embodiments, therefore, the sonication feature can allow for different frequencies to be applied to the treatment tank in which the catalytic converter is being treated. That is, a single frequency or a mixture of frequencies can be applied simultaneously if so desired.

According to certain embodiments of the present invention, a portion of the fly ash and large particles of contaminants located on the surface of the substrate (e.g., catalytic converter) being treated can be physically removed prior to treating the substrate (e.g., catalytic converter) with the treatment composition. In such embodiments, the physical removal of fly ash and contaminants can be accomplished, for example, by moving a stream of pressurized vapor, (e.g., air) across or through the substrate (e.g., catalytic converter) to loosen or dislodge a portion of material that has collected on the substrate (e.g., catalytic converter). In one particular example, an air gun (e.g., 50-100 psi) can be used as a source of pressurized air. A vacuum device can also be used to collect loose or dislodged particles. Total time for dislodging particles from the substrate (e.g., catalytic converter) depends on the size of the substrate (e.g., catalytic converter), but can typically range from 5 to 60 minutes. In certain preferred embodiments, a portion of any fly ash and/or large particles of contaminants located on the surface of the catalytic converter being treated can be physically removed by a blasting technique in which the catalytic converter is treated with a blasting stream comprising a pressurized carrier gas and a particulate blasting medium directed at a flue gas inlet side of the catalytic converter. The particulate blasting medium can include dry ice particulates, aluminum oxide particulates, sand or silica particulates, silicon carbide particulates, crushed glass, glass beads, plastic beads, pumice, steel shot, steel grit, corn cob particulates, nut shell particulates, soda particulates, ice particulates, and combinations of any thereof. The particulate blasting medium can have a size ranging from about 0.05 mm up to 20 mm. According to certain embodiments, the blasting stream can comprise a pressurized carrier gas that propels the particulate blasting medium at the catalytic converter. The carrier gas can be any suitable gas that may be pressurized. Examples of suitable carrier gases include, but are not limited to, air, nitrogen, carbon dioxide, inert or noble gases, and mixtures of any thereof. The carrier gas may be pressurized to a pressure sufficient to cause the blasting stream to leave the nozzle of the blasting device at a pressure ranging from about 17.4 psig to about 4000 psig (about 900 torr to about $2.07 \times 10^5$ torr). In specific embodiments, the pressurized carrier gas may be air. According to certain embodiments, the pressurized air may have a dew point ranging from about 0° C. to about 38° C. Suitable blasting techniques are described in greater detail in U.S. Pat. No. 8,268,743, which is hereby incorporated by reference.

In addition to providing methods for softening or removing a calcium material, another aspect of the invention provides methods of regenerating a catalytic converter. In accordance with certain embodiments of the present invention, a catalytic converter (e.g., a DeNOx catalyst and/or SCR catalyst) having a calcium-containing fly ash deposited directly or indirectly thereon can be treated with a treatment composition to at least one of soften or remove at least a portion of the calcium-containing fly ash. The treatment composition, according to certain embodiments of the present invention, can comprise at least one organosulfur oxoacid or salt thereof as discussed herein. After subjecting the catalytic converter to a treatment with an organosulfur oxoacid or salt thereof as discussed herein, a portion of any remaining calcium-containing fly ash remaining on the catalytic converter can be directly (e.g., spraying with fluid, scrapping, brushing, etc.) or indirectly (e.g., ultrasonic treatment) physically removed as discussed herein. The catalytic converter, preferably having a majority of the calcium-containing fly ash removed, can be impregnated with at least one NO removal catalyst to provide a regenerated catalytic converter.

In accordance with certain embodiments of the present invention, the catalytic converter being regenerated can comprise a plate, honeycomb, corrugated or mesh-type configuration. For example, the catalytic converter to be treated/regenerated can comprise a honeycomb-style catalytic converter including a plurality of honeycomb shaped channels in which at least a portion of the honeycomb shaped channels are plugged or blinded over prior to treatment/regeneration.

In certain preferred embodiments, the catalytic converter is subjected to a detoxing process (e.g., a wet-chemical cleaning operation) to remove at least a portion of any accumulated catalytic poisons (e.g., sodium, potassium, arsenic, phosphorous, iron, or combinations thereof) from the catalytic converter subsequent to treating with the treatment composition and prior to impregnation with a $NO_x$ removal catalyst.

Prior to the step of impregnating with at least one NO removal catalyst, a step of at least partially drying the catalytic converter (e.g., after a step of physically removing a portion of any remaining calcium-containing fly ash or after the detoxing process). Drying can be accomplished by any suitable means. Preferably the catalytic converter is dried in air. More preferably, the catalytic converter is dried by passing air across surfaces of the catalytic converter. The air that is used for drying is preferably at a temperature of from 20° C. to 700° C., more preferably from 50° C. to 300° C.

Once the catalytic converter is at least partially dried, the catalytic converter can be impregnated with at least one $NO_x$ removal catalyst. This impregnation can be used to return the catalytic converter to its former $NO_x$ removal activity or to enhance $NO_x$ removal activity from any baseline condition (e.g., a pre-regeneration $NO_x$ removal activity level). For instance, the pre-regeneration $NO_x$ removal activity level can comprise a $NO_x$ removal activity level exhibited by the catalytic converter when new (e.g., prior to being in operation in a power plant). Alternatively, the pre-regeneration $NO_x$ removal activity level can comprise a $NO_x$ removal activity level exhibited by the catalytic converter during any time period of operation in the combustion process (e.g., a coal-fired power plant).

The catalytic converter can be impregnated with one or more $NO_x$ reduction catalyst metals selected from the group consisting of Group 4, 5 and 6 metals. It should be noted, however, that the chemicals used for impregnation are precursors of the actual NOx reduction catalyst. That is, a subsequent heat treatment on-site or during the start-up of the SCR system oxidizes the metals and chemically bonds them to the substrate. In one embodiment, the catalytic converter is impregnated with vanadium or tungsten so that the active component is supported on or embedded in the catalytic converter as is generally understood in the art. As noted above, however, only during the initial production process of the catalytic converter is typically when the vanadium and tungsten is embedded in or homogeneously distributed throughout the substrate since it is added to the substrate dough prior to the extrusion and calcination process. During an impregnation process the vanadium or tungsten are supported on the substrate.

As one example of impregnating the catalytic converter with vanadium, the catalytic converter can be soaked in an aqueous solution prepared by dissolving a vanadium compound (e.g., vanadium oxalate, ammonium metavanadate or vanadyl sulfate) in water, an organic acid, or an amine solution. As one example, a treated catalyst is placed in a solution of vanadium oxylate which contains from 0.1 wt. % to 10 wt. % vanadium for a period of from 1 second to 60 minutes, preferably from 2 seconds to 2 minutes. Following vanadium impregnation, the catalytic converter is heat treated in a drying oven to a final temperature of at least 100° C., preferably at least 150° C. In one embodiment, the impregnated catalytic converter (e.g., a regenerated catalytic converter) contains about 0.3% by weight to about 3% by weight of $V_2O_5$, based on the total weight of the impregnated catalytic converter without the metals substrate. The catalytic converter is preferably heat treated in a calcining furnace to convert the vanadium compound to its catalytically useful oxide form, $V_2O_5$, preferably at least 300° C., more preferably 425° C. Heating above 450° C. may cause the titanium dioxide crystal structure to change to the undesirable rutile crystal structure. The actual amount of vanadium taken up by the catalytic converter in the impregnation process is measured by x-ray fluorescence spectroscopy.

As one example of impregnating the catalytic converter with tungsten, the catalytic converter can be soaked in an aqueous solution prepared by dissolving a tungsten compound (e.g., ammonium-tungstate or tungsten chloride) in water, hydrochloric acid, an amine solution or an organic acid. In certain embodiments, tungsten is impregnated in combination with vanadium. This can be accomplished in a single step or in separate steps.

As one example of tungsten and vanadium impregnation, chemically compatible forms of tungsten and vanadium, such as ammonium meta-vanadate and ammonium para-tungstate, are combined in a single solution containing from 2 to 100 g/l vanadium in the ammonium vanadate solution (measured as $V_2O_5$), and from 5 to 65 g/l tungsten in the ammonium para-tungstate solution (measured as $WO_3$). A treated catalyst is exposed to this base metal containing solution for a period of from 1 second to 60 minutes, preferably from 2 seconds to 2 minutes, and then heat treated in a drying oven to a final temperature of at least 100° C., preferably at least 150° C. The catalytic converter is preferably heat treated in a calcining furnace to convert the vanadium and tungsten compounds to its catalytically useful oxide form, $V_2O_5$ and $WO_3$, preferably at least 300° C., more preferably 425° C. Heating above 450° C. may cause the titanium dioxide crystal structure to change to the undesirable rutile crystal structure. Following heat treatment and calcinations, the concentrations of vanadium and tungsten are measured by x-ray fluorescence spectroscopy. Desirable concentrations of these metals can range from 0.3 wt % to 3 wt % vanadium pentoxide and 2 wt % to 8 wt % tungsten trioxide, based on the total weight of the impregnated substrate or catalytic converter.

Additional benefits realized by certain embodiments of the present invention include simplification in treatment of wastewater generated from treating or regenerating catalytic converters. For instance, the use of inorganic acid rather than an organic acid allows for wastewater treatment to be more cost effective. Organic acids require more chemicals to be used in the wastewater treatment process to ensure complete oxidation. That is, failure to completely oxidize organic materials in wastewater will cause the oxygen content of the water to undesirably decrease. Oxygen concentrations can fall below the minimum required by aquatic animals if the rate of oxygen utilization exceeds replacement by atmospheric oxygen. As such, wastewater that does not meet certain Chemical Oxygen Demands (COD) or Biochemical Oxygen Demands (BOD) may not be permitted to be discharged to the local wastewater treatment plant.

EXAMPLES

The present disclosure is further illustrated by the following examples, which in no way should be construed as being limiting. That is, the specific methods and results described in the following examples are merely illustrative, and not limiting.

I. Plugged Log Tests (all Using a 4% Sulfamic Acid Solution; pH~1)

The objective of these studies was to investigate the use of sulfonic acids and their salts, particularly sulfamic acid, for catalyst cleaning, its effectiveness on pluggage removal, and its effect on the catalyst composition. Sulfamic acid is particularly advantageous, as illustrated below, because the formed calcium sulfamate is highly water soluble.

Example 1

An inlet piece of a log (e.g., honeycomb-style catalytic converter) was completely submerged in solution (i.e., 4% Sulfamic acid solution) with inlet side up, representing the orientation in a production tank. Fly ash containing approximately 15% calcium oxide that was deposited on the log started to loosen up and fall out of the honeycomb structure. The fly ash on the top of the log remained hard.

The log was then allowed to sit in the sulfamic acid solution for 48 hours.

After sitting 48 hours in the solution, the ceramic material was still sturdy. Upon squeezing in hand, the honeycomb remained intact and did not fall apart.

Example 2

An inlet piece of a log (e.g., honeycomb-style catalytic converter) having fly ash containing 15% calcium oxide deposited thereon was heated at 350° C. for 5 hours. The piece was removed from the oven and allowed to sit in the laboratory environment for 48 hours to absorb any atmospheric moisture. The log piece was then placed in a 4% sulfamic acid solution. Removal of fly ash was observed from the honeycomb via action of the sulfamic acid solution. The top few mm of fly ash on each log remained hard after submersion in sulfamic acid. This could be due to mixing with small pieces of LPA ("popcorn ash"), long term exposure to atmospheric moisture, etc.) Removal of the fly ash behind the inlet is still advantageous since this increases the available catalyst surface area, thus allowing for improved subsequent cleaning solution penetration into the channels. After drying, the fly ash was softer and can be pushed out of channels with mechanical force (e.g., air blowing, pressure washing, dry-ice blasting, cutting catalyst, etc.).

Example 3

An inlet piece of a log (having calcium-containing fly ash deposited thereon) was heated at 350° C. for 5 hours. The log piece was removed from the oven and placed in a fresh solution of 4% sulfamic acid. After a few minutes, the fly ash on the top of the honeycomb appeared to harden. The log piece was allowed to remain in the solution overnight. After soaking overnight, an observation was made that not much more fly ash was removed.

Accordingly, it appears that the addition of a hot piece of honeycomb catalyst with fly ash on top has less desirable results then adding a piece that has not been heated (e.g., added at or around ambient temperature). The pieces tested without heating (e.g., added at or around ambient temperature) had the fly ash on the top of the honeycomb somewhat dissolve and removed from the honeycomb more readily.

Example 4

The front ½ inch of a piece of honeycomb catalyst was cut off from a log and discarded. The remaining piece was placed in a 4% sulfamic acid solution. After sitting for 10 minutes, most of the fly ash appeared to have fallen out of the honeycomb, with the exception of the front few millimeters.

The cut piece was allowed to remain in solution overnight. After soaking overnight, however, not much additional fly ash was removed.

Example 5

The front 1 inch of a piece of honeycomb catalyst was cut off from a log and discarded. The remaining piece was placed in a 4% sulfamic acid solution. After sitting for 10 minutes, most of the fly ash appeared to have fallen out of honeycomb, other than the popcorn ash.

Example 6

Figure 2:
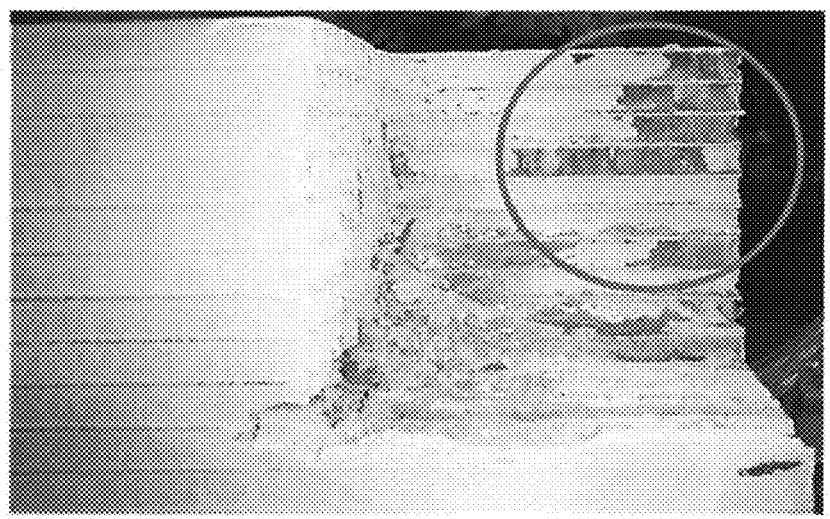
FIG. 2 shows a cross-sectional view of the log in FIG. 1 with a piece cut-out.
Figure 3:
FIG. 3 shows the length of hard fly ash removed from the inlet side of the log shown in FIG. 1.
Figure 4:
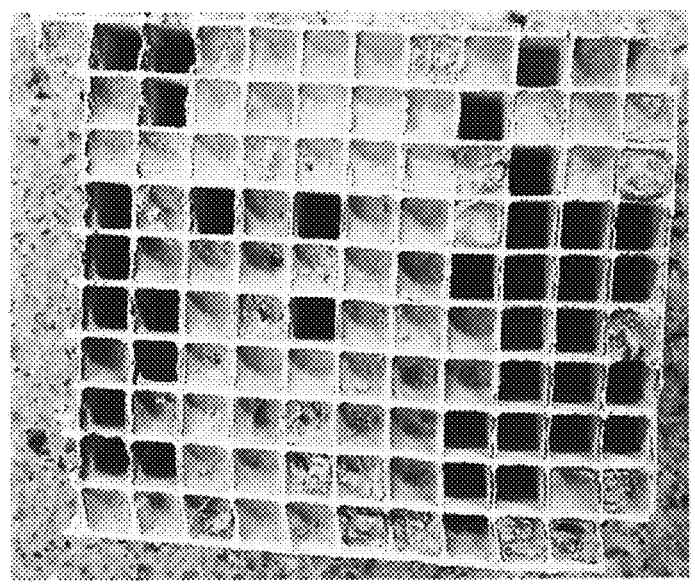
FIG. 4 shows a view of the inlet side of a log section that was removed from the log shown in FIG. 1.
Figure 5:
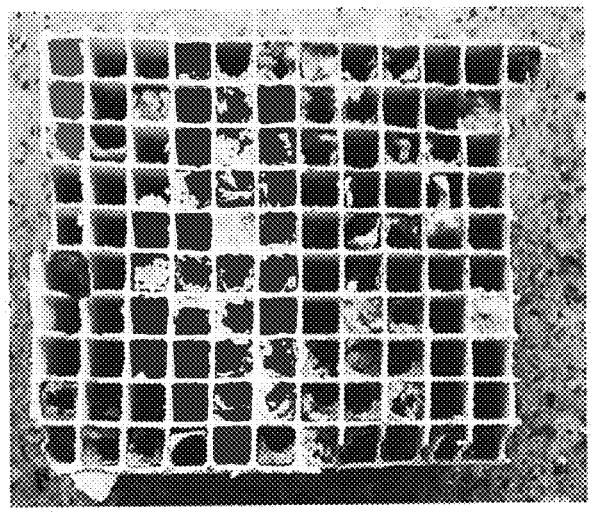
FIG. 5 shows a view of the back side of the log section shown in FIG. 4.

An inlet piece of a log was completely submerged in solution with the gas flue inlet side up, representing the orientation in a production tank. FIG. 1 shows the honeycomb substrate prior to being submerged with the square drawn around the section that was cut out and submerged. FIG. 2 shows a cross-sectional view of the log with the piece cut-out. In FIG. 2, the circled portion illustrates the depth to which fly ash was embedded within the inlet side of the cells of the log. FIG. 3 shows the length of hard fly ash removed from the inlet side of the log. FIG. 4 shows a view of the inlet side of the log section that was cut out for treatment in the sulfamic acid solution while FIG. 5 shows the back side of the same log section.

Figure 6:
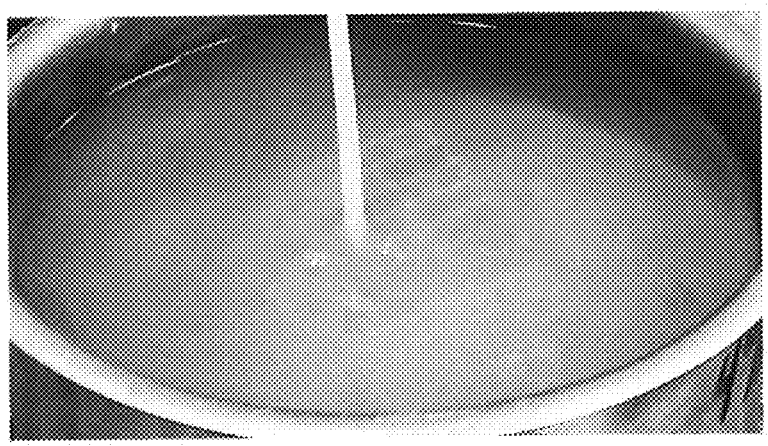
FIG. 6 shows the initial submersion of the log section from FIGS. 4 and 5 submerged in a 4% sulfamic acid solution.

Fly ash containing approximately 5% calcium oxide started to loosen up and fall out of honeycomb upon submersion into solution. FIG. 6 shows the initial submersion of the log section submerged in the 4% sulfamic acid solution. Out of 110 cells, 76 cells were initially plugged or blinded with fly ash as shown clearly in FIG. 4.

Figure 7:
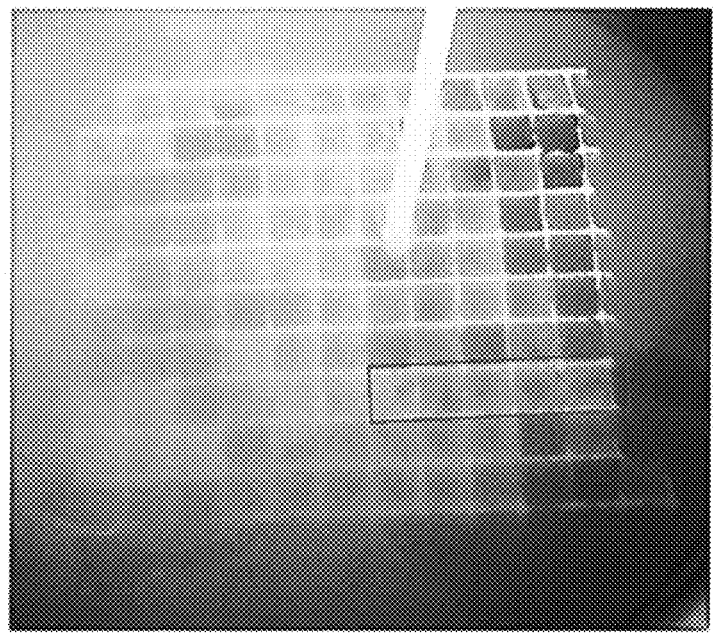
FIG. 7 shows the log section from FIGS. 4 and 5 completely submerged in the sulfamic acid solution after 1 minute including a red box showing where some of the fly ash is dissolving.
Figure 8:
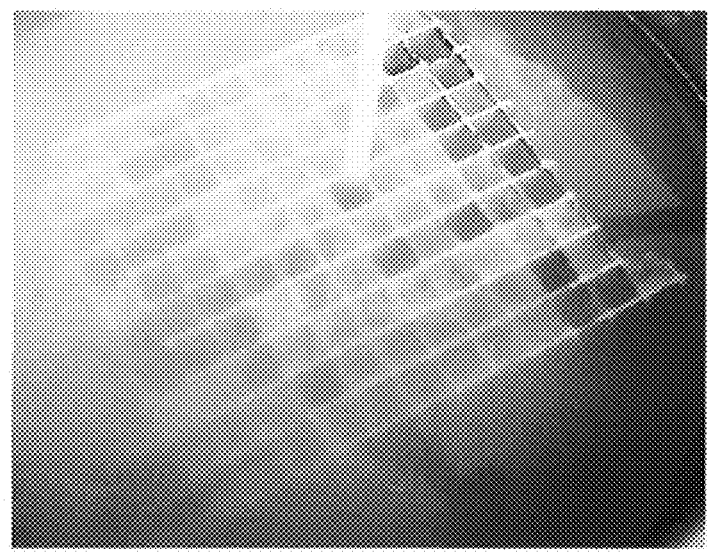
FIG. 8 shows the log section from FIGS. 4 and 5 completely submerged in the sulfamic acid solution after 10 minutes.
Figure 9:
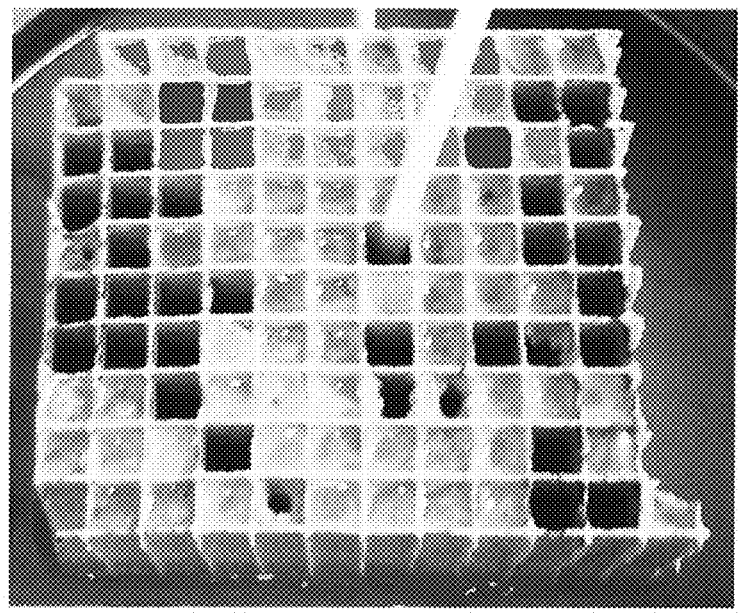
FIG. 9 shows the log section from FIGS. 4 and 5 partially removed from the sulfamic acid solution after 5 hours of treatment.
Figure 10:
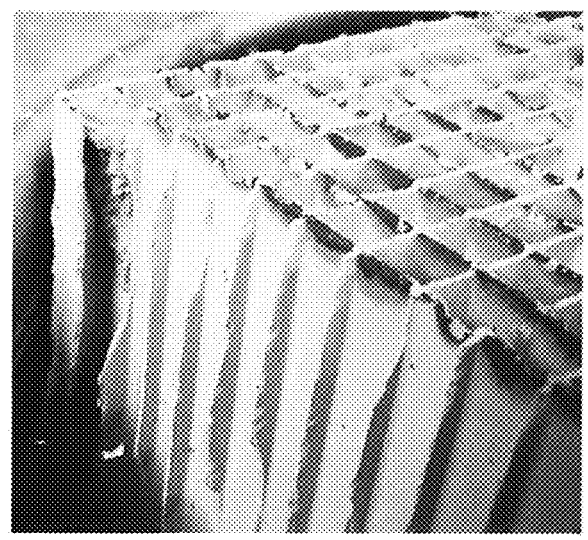
FIG. 10 shows the log section from FIGS. 4 and 5 partially removed from the sulfamic acid solution after 5 hours of treatment.

FIG. 7 shows the log section completely submerged in the sulfamic acid solution after 1 minute. The rectangular box in FIG. 7 shows were some of the fly ash is beginning to dissolve. FIG. 8 shows the log section submerged after 10 minutes, while FIGS. 9 and 10 each show the log section partially removed from the sulfamic acid solution after 5 hours of treatment.

Figure 11:
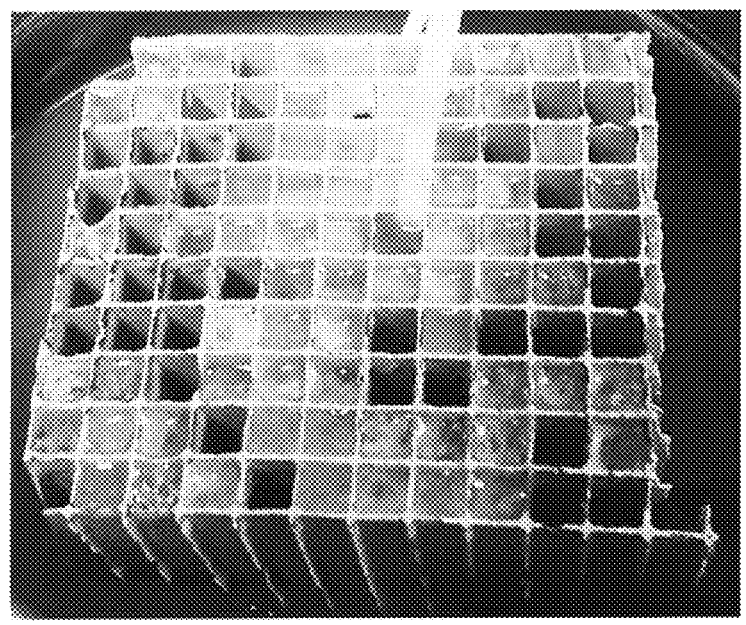
FIG. 11 shows the inlet side of the log section from FIGS. 4 and 5 partially removed from the sulfamic acid solution after 24 hours of treatment.
Figure 12:
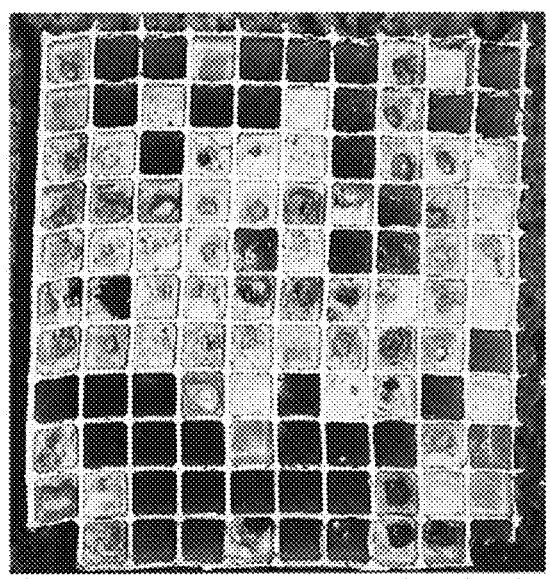
FIG. 12 shows the inlet side of the log section from FIGS. 4 and 5 completely removed from the sulfamic acid solution after 24 hours of treatment.
Figure 13:
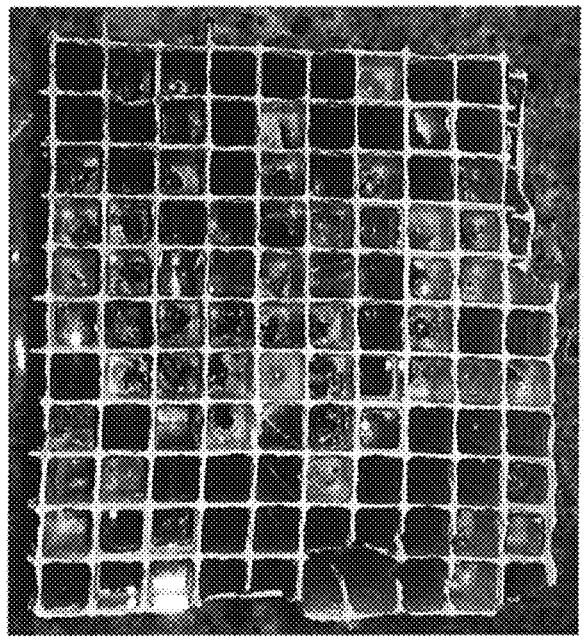
FIG. 13 shows the back side of the log section from FIGS. 4 and 5 completely removed from the sulfamic acid solution after 24 hours of treatment.

After soaking 24 hours, there were only 37 cells that had fly ash remain just at the front end as shown in FIGS. 11 and 12. FIG. 13 shows the back side of the log section after soaking in the sulfamic acid solution for 24 hours. The pluggage ranges from 5 mm to 10 mm deep into the cells from the front of the piece of log. The solution was able to penetrate into the fly ash allowing some of the initially plugged channels to have holes which will beneficially allow for improved subsequent cleaning solution penetration into the channels. After drying, the fly ash was softer and could be pushed out of channels with mechanical force, whereas prior to soaking, the fly ash was hard and unable to be removed from channels with mechanical force.

Example 7

Figure 14:
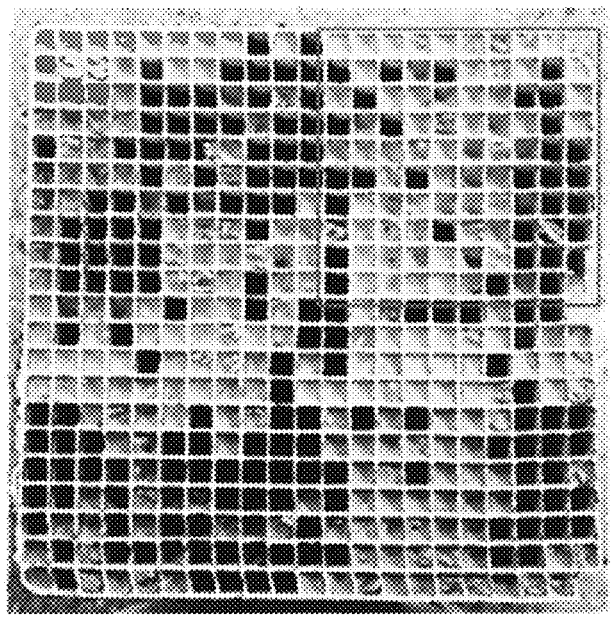
FIG. 14 shows the inlet side of a plugged log with a box drawn around a portion of the log that was ultimately cut out and soaked in a water bath.
Figure 15:
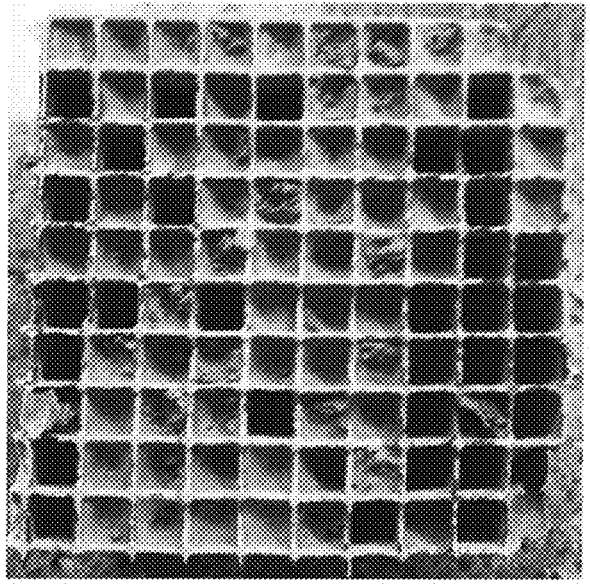
FIG. 15 shows the inlet side of the cut out portion of the log from FIG. 14 prior to soaking in water.
Figure 16:
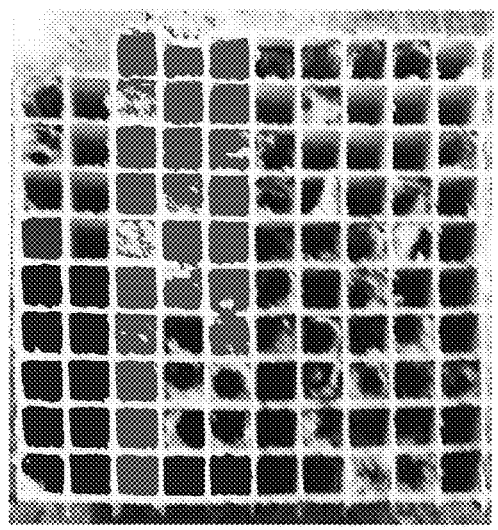
FIG. 16 shows the back side of the cut out portion of the log from FIG. 14 prior to soaking in water.

FIG. 14 shows the inlet side of a plugged log with a box drawn around a portion of the log that was cut out and used for testing. FIG. 15 shows the inlet side of the cut out portion of the log prior to testing while FIG. 16 shows the back side of the cut out portion prior to testing. As shown in FIG. 15, the inlet piece of the cut out portion of the log had 66 cells out of 100 cells initially plugged or blinded with fly ash.

Figure 17:
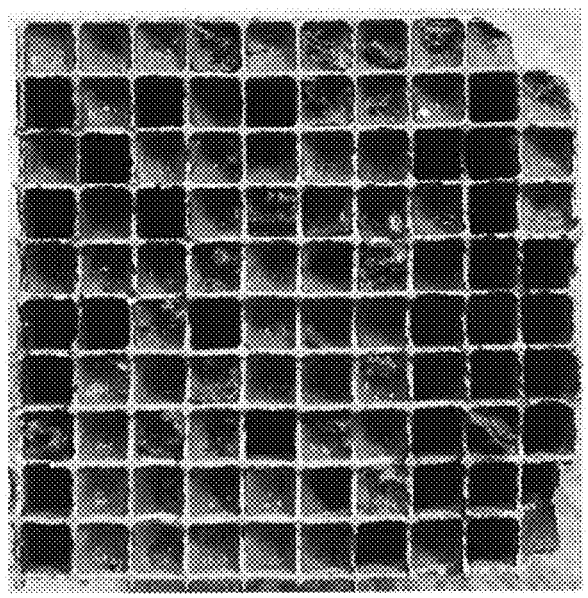
FIG. 17 shows the inlet side of the log portion shown in FIG. 15 after soaking in water for 1 hour.
Figure 18:
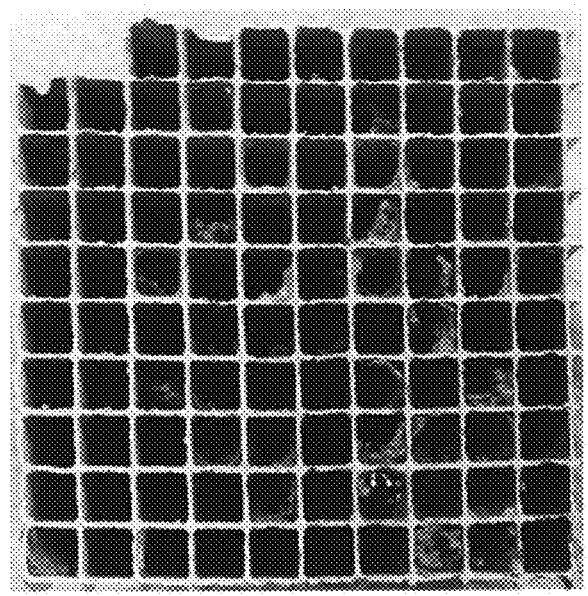
FIG. 18 shows the back side of the log portion shown in FIG. 15 after soaking in water for 1 hour.

The cut out portion of the log was completely submerged in water and after soaking for 1 hour, 64 cells remained plugged on the inlet side as shown in FIG. 17. FIG. 18 shows the back side of the log portion after soaking in water for 1 hour. After drying, the fly ash remained as hard as it was prior to soaking.

Example 8

Calcium Sulfate Dihydrate Solubility Test

To illustrate that the addition of sulfamic acid can increase the solubility of calcium sulfate dihydrate in water, the following test was conducted. It should be noted that in the absence of sulfamic acid, the solubility of calcium sulfate dihydrate is 2 g/L in water at 20° C.

To begin, 0.18 g $CaSO_4.2H_2O$ (calcium sulfate dihydrate) (1.8 g/L calcium sulfate) was added to 100 ml of water held within a beaker. With stirring, small particles remained on the bottom of the beaker. 1 g of sulfamic acid was added to the beaker and continued stirring (10 g/L sulfamic acid).

An additional 1 g of sulfamic acid (2 grams total sulfamic acid; 20 g/L sulfamic acid) was added to the beaker. Any particles remaining after the first addition of 1 g of sulfamic acid appeared to have gone into solution with the addition of the second addition of 1 g or sulfamic acid.

Next, an additional 0.18 g $CaSO_4.2H_2O$ (0.36 grams total; 3.6 g/L calcium sulfate) was added to the beaker. The solution was initially cloudy but eventually cleared up. An additional 0.18 g $CaSO_4.2H_2O$ (0.54 grams total; 5.4 g/L calcium sulfate) was then added to the beaker. Again, the solution was initially cloudy but eventually cleared up. After the contents in the beaker cleared up, an additional 0.18 g $CaSO_4.2H_2O$ (0.72 grams total; 7.2 g/L calcium sulfate) was added to the contents held within the beaker. The solution became cloudy and remained cloudy.

To the cloudy contents within the beaker, 1 g of sulfamic acid (3 grams total sulfamic; 30 g/L sulfamic acid) was added and heated solution to 40° C. The solution cleared slightly. The heat was turned off and stirring was stopped to observe what material might settle out on the bottom of the beaker. After 8 hours, a few particles had settled out of solution.

The contents were allowed to sit overnight (i.e., an additional 16 hours bringing the total time of sitting after turning off heat and stirring to 24 hours). No additional particles appeared to have settled out of solution after sitting overnight.

As illustrated by the above-described testing, the addition of sulfamic acid significantly increased the aqueous solubility of calcium sulfate dehydrate.

II. Module Pluggage Removal Test

A honeycomb style catalytic converter module having around 90% of its channels plugged (by visual inspection) with fly ash containing approximately 15% calcium oxide was taken from inventory for testing. A 4% solution of sulfamic acid was made. In particular, a tank was filled to 1500 gallons with water and approximately 500 lbs of 99.8% sulfamic acid was added. The pH of the solution ranged from 0.9 to 1.0 (although the pH can range, for example, from 0.7 for more concentrated solutions to 1.8 for a 2% solution).

Once the module was inserted into the tank containing the sulfamic acid solution, fly ash started coming off the top of the module as dust due to the force of the liquid coming up through the channels and moist fly ash started coming out of the top of the channels. The module was raised and fly ash fell from the bottom of module. The module was then lowered back into the solution and let sit for 10 minutes. Upon complete submersion, the solution bubbled as air was being displaced by the solution penetrating the fly ash.

The module was then allowed to sit in the sulfamic acid solution overnight. After sitting overnight, the module was removed and allowed to sit for 1 hour in a tank containing process water between 40° C. and 50° C. This tank is equipped with piping to allow for air injection and for air bubbles to be in direct contact with the underside of the module, helping to force the calcium-containing fly ash out of the catalyst channels.

After treatment, the module contained between 15-20% pluggage by visual inspection.

The foregoing disclosure provides illustrative embodiments of the invention and is not intended to be limiting. As understood by those of skill in the art, the overall invention, as defined by the claims, encompasses other preferred embodiments not specifically enumerated herein.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of softening or removing a calcium material from a substrate, comprising:
   a. providing a substrate comprising a catalytic converter, said catalytic converter including the calcium material deposited directly or indirectly on at least a portion of the catalytic converter;
   b. treating the catalytic converter with an acid treatment composition comprising an acid selected from the group consisting of organosulfur oxoacid or salts thereof, sulfinic acid or salts thereof, sulfenic acid or salts thereof, amino sulfonic acid or salts thereof, and combinations thereof, and wherein the organosulfur oxoacid has an alkyl group.

2. The method according to claim 1, wherein the acid treatment composition comprises at least one sulfinic acid or salt thereof, sulfenic acid or salts thereof, or combinations thereof.

3. The method according to claim 1, wherein the at least one organosulfur oxoacid or salt thereof having an alkyl group comprises a sulfonic acid or salt thereof.

4. The method according to claim 1, wherein the acid treatment composition comprises an amino sulfonic acid.

5. The method according to claim 1, wherein the acid treatment composition comprises at least one of sulfamic acid, sodium sulfamate, triethylamine sulfamate, and monoethanolamine sulfamate.

6. The method according to claim 4, wherein the amino sulfonic acid or salt thereof is sulfamic acid.

7. The method according to claim 1, wherein the catalytic converter comprises a DeNOx catalyst.

8. The method according to claim 1, wherein the catalytic converter comprises a SCR catalyst.

9. The method according to claim 1, wherein the catalytic converter has approximately a 20 to 70% loss of DeNOx performance activity.

10. The method according to claim 1, wherein said treating step comprises at least partially submerging the catalytic converter in the acid treatment composition.

11. The method according to claim 10, wherein said treating step comprises at least partially submerging the catalytic converter in the acid treatment composition for 2 minutes to 48 hours.

12. The method according to claim 10, wherein the acid treatment composition comprises an aqueous solution comprising at least one organosulfur oxoacid having an alkyl group, amino sulfonic acid, or salts thereof, said aqueous solution comprising a pH from 0.5 to 5.

13. The method according to claim 10, further comprising a step of subjecting the acid treatment composition to an ultrasonic treatment for at least a portion of the time in which the catalytic converter is at least partially submerged in the treatment composition.

14. The method according to claim 13, wherein said ultrasonic treatment comprises applying ultrasonic sound at an intensity from 15 kHz to 150 kHz with the applied power ranging from 3 to 15 watts per liter of acid treatment composition.

15. The method according to claim 1, further comprising a cleaning step subsequent to step (b), said cleaning step comprising directly or indirectly physically removing at least a portion of any remaining or softened calcium material remaining on the catalytic converter.

16. The method according to claim 15, wherein said cleaning step comprises spraying the catalytic converter with a fluid, scrapping the material off of the catalytic converter, subjecting the catalytic converter to an ultrasonic treatment, subjecting the catalytic convertor to a blasting technique, or combinations thereof.

17. The method according to claim 1, wherein the at least one organo sulfur oxoacid having an alkyl group, amino sulfonic acid, or salts thereof comprises at least one member according to the general formula:

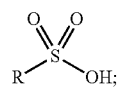

wherein,
R is an alkyl, or amine moiety.

18. The method according to claim 17, wherein R is an amine moiety.

19. The method according to claim 1, wherein the amino sulfonic acid or salt thereof comprises at least one member according to the general formula

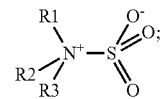

wherein,
R1, R2, and R3 are independently selected from an alkyl, aryl, or hydrogen.

20. The method according to claim 1, wherein said calcium material contains at least 15 wt % calcium oxide based on total weight of the calcium material.

21. The method according to claim 1, wherein said calcium material comprises fly ash.

22. A method of regenerating a catalytic converter, comprising:
   a. providing a catalytic converter having a calcium-containing fly ash deposited thereon;
   b. treating the catalytic converter from step (a) with an acid treatment composition, said acid treatment composition comprises an acid selected from the group consisting of organosulfur oxoacid or salts thereof, sulfinic acid or salts thereof, sulfenic acid or salts thereof, amino sulfonic acid or salts thereof, and combinations thereof, and wherein the organosulfur oxoacid has an alkyl group;
   c. directly or indirectly physically removing at least a portion of any remaining calcium-containing fly ash remaining on the catalytic converter;
   d. impregnating the catalytic converter with at least one $NO_x$ removal catalyst to provide a regenerated catalytic converter.

23. The method according to claim 22, further comprising a step of at least partially drying the catalytic converter subsequent to step (c).

24. The method according to claim 22, wherein the catalytic converter comprises a DeNOx catalyst.

25. The method according to claim 22, wherein the catalytic converter comprises a SCR catalyst.

26. The method according to claim 22, wherein the regenerated catalytic converter exhibits an increased NOx removal activity level relative to a pre-regeneration NOx removal activity level.

27. The method according to claim 26, wherein the pre-regeneration NOx removal activity level comprises a NOx removal activity level exhibited by the catalytic converter when new.

28. The method according to claim 26, wherein the pre-regeneration NOx removal activity level comprises a NOx removal activity level exhibited by the catalytic converter during operation in a coal-fired power plant.

29. The method according to claim 22, further comprising subjecting the catalytic converter to a detoxing process to remove at least a portion of any accumulated catalytic poisons from the catalytic converter.

30. The method of claim 22, wherein the detoxing process comprises subjecting the catalytic converter to a wet-chemical cleaning operation in which one or more catalytic poisons are removed from the catalytic converter.

31. The method according to claim 30, wherein the catalytic poisons comprise sodium, potassium, arsenic, phosphorous, iron, or combinations thereof.

32. The method according to claim 22, wherein the catalytic converter provided in step (a) comprises a honeycomb-style catalytic converter including a plurality of honeycomb shaped channels; wherein at least a portion of the honeycomb shaped channels are plugged or blinded over.

33. The method according to claim 22, wherein said calcium-containing fly ash contains at least 15 wt % calcium oxide based on total weight of the said calcium-containing fly ash.

34. The method according to claim 22, wherein the acid treatment composition comprises at least one sulfenic acid or salt thereof, sulfonic acid having an alkyl group or salt thereof, or combinations thereof.

35. The method according to claim 22, wherein the treatment composition comprises an aqueous solution and has a pH from 0.5 to 5.0.

36. The method according to claim 1, wherein the treatment composition comprises at least one organosulfur oxoacid having an alkyl group, amino sulfonic acid, or salts thereof in combination with sulfuric acid, sulfurous acid, or both.

37. The method according to claim 22, wherein the treatment composition comprises at least one organosulfur oxoacid having an alkyl group, amino sulfonic acid, or salts thereof in combination with sulfuric acid, sulfurous acid, or both.

38. A method of softening or removing a calcium material from a substrate, comprising providing a substrate having a calcium material deposited directly or indirectly on at least a portion of the substrate; and treating substrate with an acid treatment composition comprising an acid selected from the group consisting of organosulfur oxoacid or salts thereof, sulfinic acid or salts thereof, sulfenic acid or salts thereof, amino sulfonic acid or salts thereof, and combinations thereof, and wherein the organosulfur oxoacid has an alkyl group.

* * * * *